United States Patent
Yin

(10) Patent No.: US 11,016,919 B2
(45) Date of Patent: May 25, 2021

(54) INTELLIGENT SWITCHING PERIPHERAL CONNECTOR

(71) Applicant: Seagate Technology LLC, Cupertino, CA (US)

(72) Inventor: Phillip Yin, Fremont, CA (US)

(73) Assignee: Seagate Technology LLC, Fremont, CA (US)

( * ) Notice: Subject to any disclaimer, the term of this patent is extended or adjusted under 35 U.S.C. 154(b) by 209 days.

(21) Appl. No.: 16/282,970

(22) Filed: Feb. 22, 2019

(65) Prior Publication Data

US 2020/0272214 A1 Aug. 27, 2020

(51) Int. Cl.
*G06F 13/40* (2006.01)
*G06F 1/3234* (2019.01)
*G06F 3/06* (2006.01)
*G06F 1/26* (2006.01)

(52) U.S. Cl.
CPC .......... *G06F 13/4004* (2013.01); *G06F 1/263* (2013.01); *G06F 1/266* (2013.01); *G06F 1/325* (2013.01); *G06F 3/0683* (2013.01); *G06F 3/0658* (2013.01)

(58) Field of Classification Search
CPC .......... G06F 1/263; G06F 1/266; G06F 1/325; G06F 1/3268; G06F 1/3275; G06F 3/0658; G06F 3/0683; G06F 13/4004; G06F 13/4022; G06F 13/4027; G06F 13/387
See application file for complete search history.

(56) References Cited

U.S. PATENT DOCUMENTS

| | | | |
|---|---|---|---|
| 5,991,530 A | 11/1999 | Okada et al. | |
| 6,866,527 B2 | 3/2005 | Potega | |
| 6,963,933 B2 | 11/2005 | Saito et al. | |
| 7,127,623 B2 | 10/2006 | Potega | |
| 7,558,899 B2 | 7/2009 | Yip | |
| 7,644,203 B2 | 1/2010 | Ingles | |
| 10,614,017 B1* | 4/2020 | Hsieh | G06F 13/4045 |
| 2010/0070659 A1* | 3/2010 | Ma | G06F 13/385 710/14 |
| 2010/0133908 A1 | 6/2010 | Weng | |
| 2014/0181350 A1* | 6/2014 | Pedro | G06F 13/4077 710/313 |
| 2015/0089092 A1* | 3/2015 | Voto | G06F 13/385 710/14 |
| 2015/0234765 A1* | 8/2015 | Kline | G06F 13/4022 710/316 |
| 2015/0338881 A1* | 11/2015 | Hsu | G06F 13/4081 710/304 |
| 2016/0321195 A1* | 11/2016 | Ghosh | G06F 13/4282 |
| 2016/0323435 A1* | 11/2016 | Antonopoulos | H04M 1/72527 |

(Continued)

*Primary Examiner* — Thomas J. Cleary
(74) *Attorney, Agent, or Firm* — Hall Estill Attorneys at Law

(57) ABSTRACT

An electrical connector can have a switch module connected to a first interface, a second interface, and a third interface with a computing device connected to the first interface, a first peripheral device connected to the second interface, and a second peripheral device connected to the third interface. The first peripheral device may communicate with the computing device via a first conduit that extends through the switch module prior to the switch module activating a second conduit that extends through the switch module in response to detection of an operational condition of the computing device.

20 Claims, 3 Drawing Sheets

(56) References Cited

U.S. PATENT DOCUMENTS

| | | | |
|---|---|---|---|
| 2017/0270067 A1* | 9/2017 | Hu | G06F 13/366 |
| 2017/0353215 A1 | 12/2017 | Jang et al. | |
| 2018/0048753 A1* | 2/2018 | Chan | G06F 13/4295 |
| 2018/0198248 A1* | 7/2018 | Sun | H01R 31/065 |
| 2018/0314661 A1* | 11/2018 | Douthat | G06F 13/4282 |
| 2018/0341310 A1* | 11/2018 | Lambert | G06F 13/4282 |
| 2019/0243435 A1* | 8/2019 | Chou | G06F 1/266 |
| 2020/0089636 A1* | 3/2020 | Luo | G06F 11/3055 |
| 2020/0272214 A1* | 8/2020 | Yin | G06F 1/263 |

* cited by examiner

INTELLIGENT SWITCHING PERIPHERAL CONNECTOR

SUMMARY

Various embodiments of the present disclosure are generally directed to a connector having circuitry providing intelligent switching between multiple separate peripheral electrical devices.

In accordance with some embodiments, an intelligent switching peripheral connector has a switch module connected to a first interface, a second interface, and a third interface with a computing device connected to the first interface, a first peripheral device connected to the second interface, and a second peripheral device connected to the third interface. The first peripheral device communicates with the computing device via a first conduit that extends through the switch module prior to the switch module activating a second conduit that extends through the switch module in response to detection of an operational condition of the computing device.

Other embodiments of an intelligent switching peripheral connects a switch module to a first interface, a second interface, and a third interface with a computing device connected to the first interface, a first peripheral device connected to the second interface, and second peripheral device connected to the third interface. Electrical signals are passed between the first peripheral device and the computing device via a first conduit that extends through the switch module prior to activation of a second conduit that extends through the switch module in response to the switch module detecting an operational condition of the computing device.

These and other features which may characterize various embodiments can be understood in view of the following detailed discussion and the accompanying drawings.

DETAILED DESCRIPTION

Without limitation, the various embodiments disclosed herein are generally directed to an electrical connector that concurrently connects, and provides intelligent switching between, multiple separate peripheral devices.

The progression of computing technology has increased the capability of devices to generate, transfer, and utilize data. Advances in hardware technology have concurrently reduced the physical size of components while providing increased the functionality, appearance, and performance of computing devices. However, increases in the capabilities, and performance of computing devices come at the cost of greater power draw data capacity usage over time.

While peripheral devices have allowed for the supplementation of a computing device's power supply, with a portable battery, and/or data capacity, with an external data storage device, a user currently must select a single peripheral device to connect to a single port of a computing device. It is noted that multiple separate peripheral devices may concurrently be connected to, and utilized by, different ports of a single computing device, but such configuration requires a plurality of connectors occupying multiple ports, which is inefficient and often not available in portable computing devices, such as tablet computers, smartphones, and smartwatches.

Accordingly, various embodiments of a peripheral device connector provide intelligent switching that allows three or more devices to operate in a complementary manner to supplement the capabilities of a computing device. As such, an intelligent connector can be configured with circuitry allowing peripheral devices to function together with, or without, host control by a connected computing device. As a non-limiting example, a connector can intelligently switch peripheral device connections to provide power to an external data storage device and/or a computing device to increase the usable life and capabilities of both the computing device and the data storage device.

Figure 1:
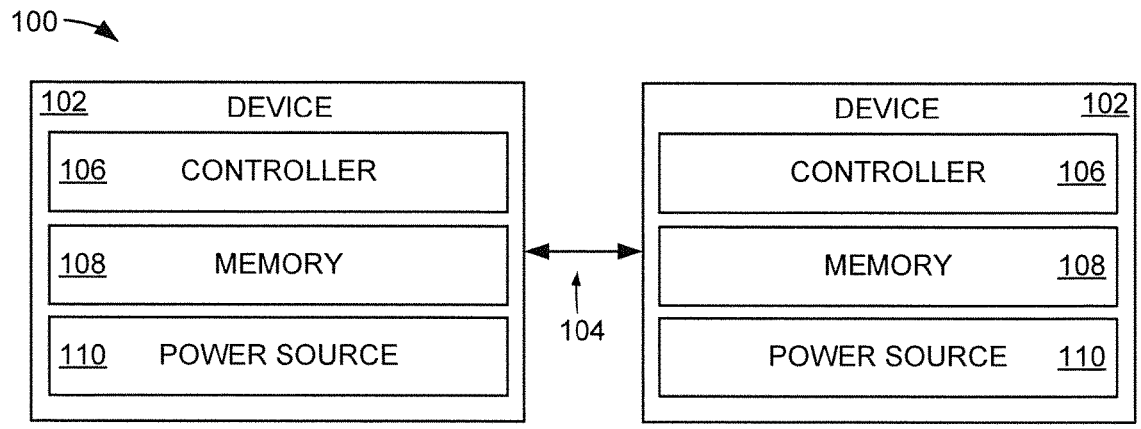
FIG. 1 provides a functional block representation of an example computing system in which various embodiments can be practiced.

An intelligent switching connector creates a relatively low-cost solution to employing multiple peripheral devices concurrently. The intelligent switching between separate peripheral devices can provide heightened performance and lifespan that is, potentially, never obsolete. FIG. 1 displays a functional block representation of an example computing system 100 in which assorted embodiments of an intelligent connector can be practiced. The system 100 can have any number of devices 102 connected via one or more wired, or wireless, connections 104.

As shown, but not required, each device 102 can be a computing device that utilizes a local controller 106, such as a programmable circuit or microprocessor. The local controller 106 can direct operation of one or more local memories 108 that can be volatile or non-volatile with data storage capabilities conducive to the storage and retrieval of data over time. Each device 102 can have a local power source 110, such as a battery, that can act as the device's sole supply of direct current (DC) electricity or supplement an alternating current (AC) power connection. That is, a device 102 can be configured to operate from multiple different power sources (AC/DC), but not concurrently.

A peripheral device, in some embodiments, may have a local controller 106 and/or memory 108, but lacks the computing capabilities and sophistication of a computing device. As such, a computing device may be a user-controlled apparatus, such as a laptop computer, tablet computer, smartphone, or smartwatch, while a peripheral device can be an apparatus controlled by non-user device or individually without user input, such as a battery, data storage device, or security module.

The connection of multiple devices 102 can provide complementary, or supplementary, capabilities. For instance, a device 102 may conduct data storage, retrieval, and/or processing that complements a connected device 102 that generated the data. As another example, a device 102 can provide supplemental data storage or DC power to a connected device 102 via one or more connections 104. The supplementing, or complementing, configuration of separate devices 102 can provide greater computing capabilities than a single device 102.

However, the cooperative connection of multiple devices 102 corresponds with one device 102 having a host designation that defines control of commands and connected devices 102 having a subservient designation, such as a "device" designation. That is, a "host" will direct operation of other connected "devices." While efficient, the designation of a single host prevents connected "devices" from controlling operation, providing some computing capabilities, or providing DC power. Thus, various embodiments are directed to optimizing the connection 106 between multiple devices 102 to allow for the switching of "host" and "device" designations to allow peripheral devices to operation independently of a connected computing device.

Figure 2:
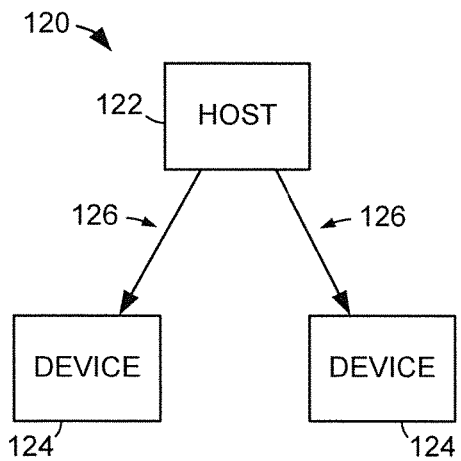
FIG. 2 shows a functional block representation of an example computing system arranged in accordance with some embodiments.

FIG. 2 displays a block representation of an example peripheral system 120 in which various embodiments of an intelligent connector can be practiced. The peripheral system 120 has a computing device 122 connected to multiple peripheral devices 124 via separate connections 126, which may be wired, wireless, or a combination thereof. The computing device 122 has a local controller 106 that executes software as directed by one or more users. The computing device 122 can access one or more peripheral devices 124 individually, or concurrently, to supplement computing capabilities and increase functionality and/or performance of the computing device.

However, the separate connections 126 of the respective peripheral devices 124 can be inefficient both in the occupation of several computing device ports and in the serial execution of commands from the computing device 122. That is, the computing device 122 is forced to poll, access, and utilize the respective peripheral devices 124 separately via the respective connections 126, which consumes valuable system 120 resources and time compared to protocol allowing the peripheral devices 124 to act independently or communicate directly to one another. As such, the exclusive control of the peripheral devices 124 by the host computing device 122 degrades possible system 120 performance and presents inefficiencies that are not scalable.

Figure 3:
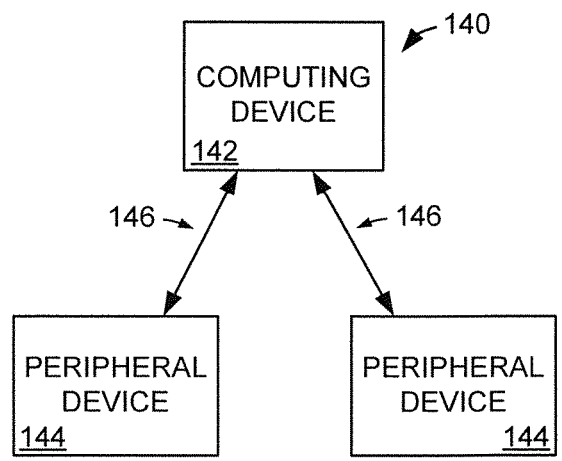
FIG. 3 is a functional block representation of an example computing system configured in accordance with some embodiments.

FIG. 3 depicts a block representation of an example computing network 140 in which a computing device 142 conducts data generation, transfer, and storage in cooperation with multiple separate peripheral devices 144 in accordance with various embodiments. In the non-limiting embodiment of the network 140 of FIG. 3, the computing device 142 is a stand-alone computer, such as a smartphone, laptop, tablet, or smartwatch, having a local controller 106 directing user inputs into digital results. The computing device 142 can operate individually by storing data in local memory 108 and operating from a local wired, or wireless, power source 110.

While any number of peripheral devices 144 can concurrently be connected to a single computing device 142, some embodiments utilize separate connections 146 to separate ports to provide power and/or data pathways. A first peripheral device, in the example embodiment of FIG. 3, is an external and portable power source, such as a battery, capacitor, solar panel, or turbine-driven power generator. A second peripheral device is an external and portable data storage device that can be any type of non-volatile memory providing data transfer and storage capabilities that supplement the computing device 142. The portable power source 144 and data storage device 144 can respectively have a local controller 106 to direct operation to a local memory 108, particularly in the data storage device, but each lack the capability for data generation or software execution in response to user input, which differentiates the peripheral devices 144 from the computing device 142.

Figure 4A:
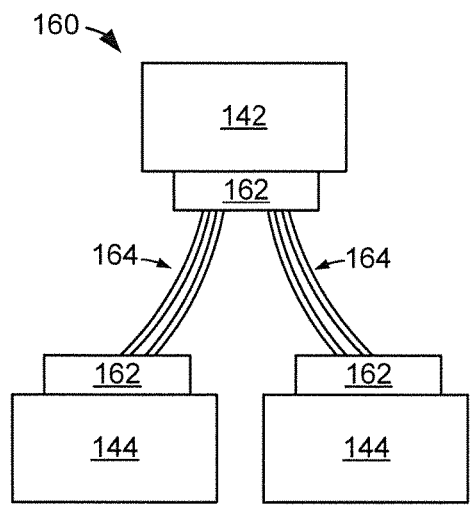
FIGS. 4A and 4B respectively convey an example peripheral system arranged in accordance with various embodiments.
Figure 4B:
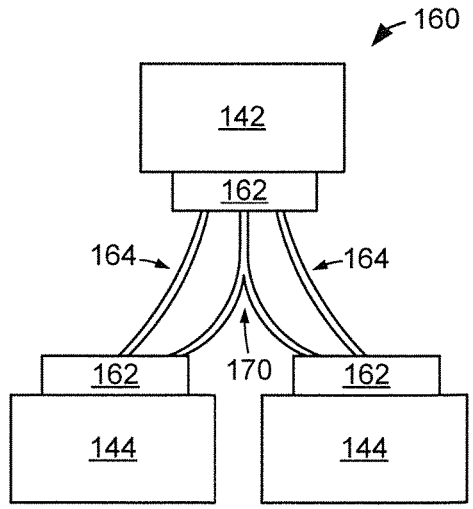

The use of multiple different external peripheral devices 144 allows for increased computing capabilities for the computing device 142, but can inefficient in terms of computing device port utilization, host command sequencing, and peripheral device 144 communication. FIGS. 4A and 4B respectively display line representations of an example connector 160 that can be employed to electrically connect multiple separate devices in accordance with some embodiments. The connector 160 of FIG. 4A has a plurality of interfaces 162 physically attached via electrical conduits 164. It is noted that the electrical conduits 164 may coincide with one or more non-electrically conductive structures that physically retain the respective interfaces 162.

The connector 160 of FIG. 4A shows how separate electrical conduits 164 can extend between a host interface 166 and respective device interfaces 168. That is, the host interface 166 can be concurrently attached to the separate device interfaces 168 via independent electrically conductive conduit 164 configurations, which may have matching, or different, electrical and/or data transportation capabilities. In the connector 160 of FIG. 4B, the respective device interfaces 164 share at least one electrically conductive conduit 170, such as conduit providing power, while having one or more independent electrically conductive conduits 164, such as conduit providing data transmission.

Whether having independent 164 or shared 170 conduits, the host interface 166 can send, and receive, power and/or data to/from any connected device. Although multiple computing devices 102/122/142 may be connected via the connector 160, communication, command generation, and command execution abide by a host-device protocol to avoid conflicts. In the event a computing device 102/122/142 is connected to the host interface 166 while peripheral devices 144 are connected to the respective device interfaces 168, as generally shown in FIG. 3, port utilization can be optimized, but the host-device conflicts maintain due to the lack of electrical/data pathways between device interfaces 168. Hence, assorted embodiments are directed to optimizing the electrical and data performance of a connector 160 connecting multiple peripheral devices to a single port of a computing device.

Figure 5:
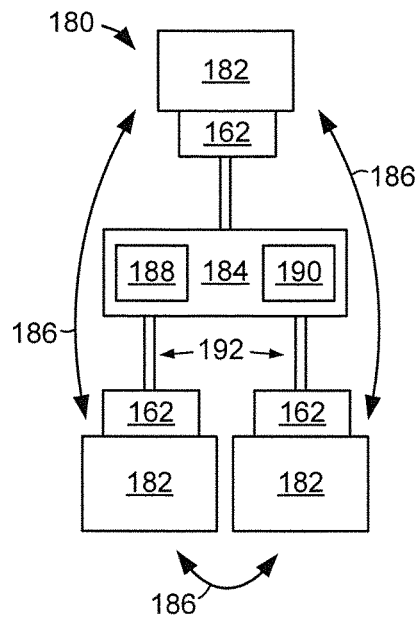
FIG. 5 depicts an example peripheral system constructed and operated in accordance with assorted embodiments.

FIG. 5 illustrates a functional line representation of an example connector 180 configured and operated in accordance with assorted embodiments. The connector 180 can have any number of interfaces 182 that can respectively attach to a device (computing or peripheral) and supply electrical pathways that can transmit power and/or data. While not required, the respective interfaces 182 can have matching, or dissimilar, configurations, such as types of universal serial bus (USB), number of pins, power transmission capabilities, or data transmission capabilities. In some embodiments, each interface 182 is a micro-B type USB while other embodiments utilize at least one micro-C type USB.

The connector 180 has a switching module 184 that comprises circuitry that intelligently alters the connection protocol between two separate interfaces 182 to allow two-way communication and command execution, as illustrated by data/power transmission arrows 186. The configuration of the circuitry of the switching module 184, which may or may not incorporate a local controller 188 and memory 190, allows a user to add the capabilities of one or more peripheral devices to a computing device without occupying multiple computing device ports or degrading computing device performance.

As shown, the switching module 184 is electrically connected to each interface 182 via a conduit 188. It is contemplated that one or more electrically conductive conduits can extend between interfaces 182 without connecting to the switching module 184. The switching module 184, in practice, intelligently steers power and/or data between devices connected via the respective interfaces 182.

In a non-limiting example, a first interface 182 could be connected to a smartphone while a second interface 182 is connected to a portable battery and a third interface 182 is connected to a portable non-volatile data storage device, such as a hard disk drive (HDD) or solid state drive (SSD). Continuing with the example, the switching module 184 can identify and service a need for power in either the smartphone or data storage device by altering the host/device modes of the respective interfaces 182 and connected devices. Similarly, the switching module 184 can identify a temporary, or permanent, need for data storage and alter the mode of the smartphone to send at least some data to the data storage device actively or passively.

It is contemplated that the switching module 184 can provide electrical, mechanical, and/or electromechanical switching of protocol modes for any connected computing, or peripheral, device to allow power and/or data to be intelligently sent to an appropriate destination to achieve, and maintain, optimal performance of at least the smartphone. For instance, the switching module 184 can detect a need for power and selectively utilize the connected battery to supply power to the data storage device during a period of high power consumption before returning power delivery to the smartphone. In other words, the switching device can alter the mode of the smartphone to "device" to allow charging from the connected battery or to "host" to allow data transfer to the external data storage device.

With the intelligent adaptation of connected device modes with the switching module 184, the connector 180 will never be obsolete due to protocol changes and the smartphone can employ at least increased power and data storage capabilities along with the capabilities of other connected peripheral devices. The mode switching ability of the switching module 184 can be automatic and/or selective to allow data and/or power to pass between devices connected to the respective interfaces 182 of a single connector 180.

Figure 6:
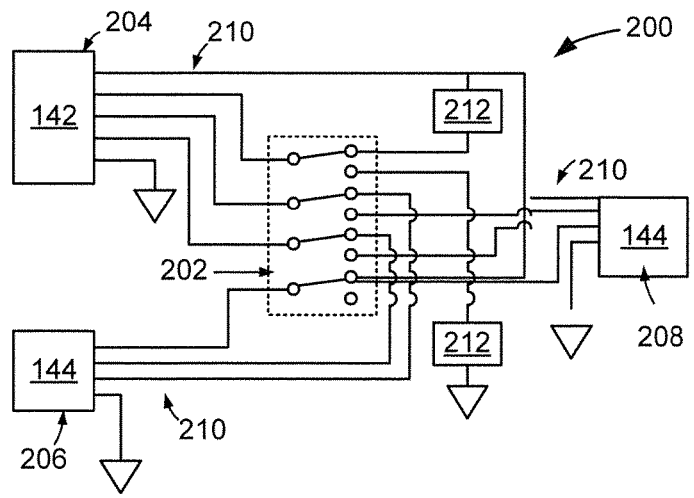
FIG. 6 displays an electrical schematic for portions of an example connector that can be employed in a peripheral system in accordance with some embodiments.

FIG. 6 conveys an electrical schematic of portions of an example device connector 200 configured in accordance with various embodiments to provide a mechanical switch 202 that can be selected by a user to designate how power and/or data flow. It is noted that the non-limiting example of FIG. 6 has a computing device 142 connected to a first interface 204, a portable battery peripheral device 144 connected to a second interface 206, and a portable data storage peripheral device 144 connected to a third interface 208, although different devices and/or additional device connections may be utilized.

As shown, each interface 204/206/208 is connected to an electrical ground, which may be a common ground or independent grounded pathways. Each interface 204/206/208 further supplies three separate electrically conductive conduits 210 to the switch 202. It is contemplated, but not required, that each interface 204/206/208 supplies a positive voltage power pathway, a negative voltage power pathway, and at least one data pathway via the respective conduits 210. The first interface 204 further provides an identification pathway to the switch 202 that indicates the protocol mode of the computing device 142, such as via the USB ID pin, or CC pin state for a micro-C interface.

The connector 200 can employ at least a resistor 212 to the switch 202 and from the switch 202, as shown, to allow functional electrical pathways thought the switch 202. It is contemplated that the respective resistors 212 can have matching, or dissimilar, electrical characteristics. As a result of the electrical configurations of the connector 200, a user can physically, or electrically, activate the switch 202 and direct power and/or data between two of the interfaces 204/206/208. The switch 202, in some embodiments, is configured to allow a user to select supplying power to the computing device 142 or the data storage device 144. In other embodiments, the switch 202 is configured to allow a user to select supplying data or power to the computing device 144.

Figure 7:
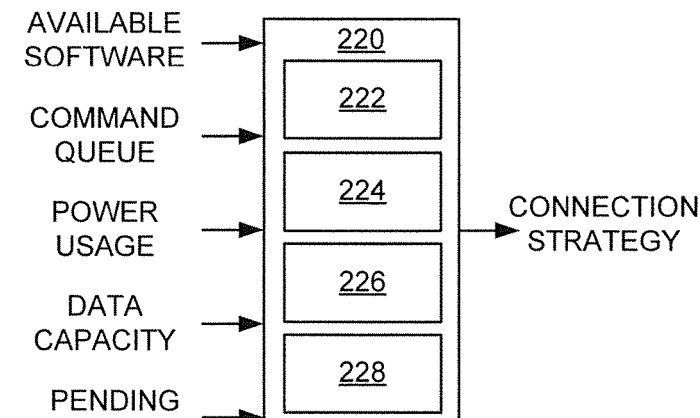
FIG. 7 illustrates a block representation of a portion of an example connector configured in accordance with various embodiments.

The ability to actively participate in the selection and utilization of the various devices 142/144 attached to the connector 200 allows for simplicity and user control that can be useful in a variety of different operational environments. However, a switching module 184 can provide passive selection of various connected devices 142/144 that can reactively and/or proactively optimize performance of at least the computing device 144. That is, a switching module 184 may alter the electrical pathways, and possibly device modes, FIG. 7 depicts a functional block representation of an example switching module 220 that can be utilized in a connector in accordance with assorted embodiments. The module 220 can detect a number of current connected device conditions, such as power usage rate, pending data command volume, data capacity, pending maintenance operations, and available software for execution, to generate one or more connection strategies that can be employed to establish and/or maintain optimal computing device operation over time.

While not required or limiting, the switching module 220 can employ a local controller 222 and/or local memory 224 to direct operation of a connection circuit 226. It is contemplated that the switching module 220 utilizes the controller and/or memory of a connected device alone, or in combination with the local components 222/224 to generate and/or carry out a connection strategy. That is, the switching module 220 may, or may not, have a controller 222 or memory 224, and in the event the module 220 has local computing components 222/224, the module 220 can utilize those components 222/224 alone, or in combination with other connected components to generate, and execute, one or more connection strategies.

A connection strategy is not limited to a particular set of instructions for device activation and connection, but can identify one or more triggers, thresholds, and situations that prompt a prescribed connection and/or mode alteration. For instance, a connection strategy can designate sending power from a peripheral battery to a computing device in response to the computing device reaching a threshold power reserve, such as 10%. The connection strategy may designate sending power from a peripheral battery to a peripheral data storage device while the data storage device is operating, or operating at a threshold power usage rate associated with data being transferred to/from the device. The connection strategy may designate the automatic passage of data, and alteration of host/device modes, from a connected computing device to a peripheral data storage device during times of low computing device usage, low power reserves, or high pending command volumes.

The flexibility of connection strategy allows for a diverse range of operational events to be accommodated quickly and efficiently by the switching module 220 to preserve, or establish, optimal computing device performance. It is contemplated that the switching module 220 alters, or replaces, a previously generated connection strategy at predetermined times, such as after an amount of time, change in connected devices, or detection of sub-optimal computing device performance. The connection strategy, in some embodiments, can be based on forecasted events/situations that have yet to occur in one or more connected devices. Such forecasting can be accomplished with a prediction circuit 228 of the connection module 220.

Figure 8:
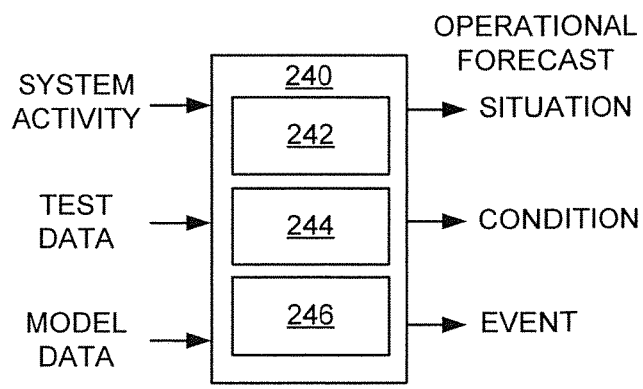
FIG. 8 shows a block representation of a portion of an example connector arranged in accordance with some embodiments.

FIG. 8 displays a block representation of an example prediction circuit 240 that can be utilized in a connection module in accordance with various embodiments. The prediction circuit 240 can maintain one or more logs 242 of activity pertinent to the operation of connected computing and peripheral devices. Such logs 242 can be stored locally, such as in the local memory 224, or remotely, such as the memory 108 of a connected device, with information identifying actual experienced activity by at least one connected device. The logged activity can be analyzed with one or more algorithms 244 to predict one or more triggers, conditions, and sequence of events that can be accommodated with the alteration of the flow of power and/or data, which may, or may not, correspond with an alteration in the mode of one or more connected devices.

While logged activity can provide actual device/system conditions, the prediction circuit 240 can also utilize modeled data 246 from other devices, connectors, and systems to increase the accuracy and/or speed of forecasting future conditions, such as the instant, or average, power usage, data usage, error rate, maintenance activity, and latency of one or more connected devices. The ability to selectively employ actual logged data and model data allows the prediction circuit 240 to efficiently identify patterns, trends, and triggers for each connected device that can degrade individual device and/or overall system performance. For instance, modeled data can be compared to logged data to compute the accuracy of previously predicted device criteria, which allows predicted criteria to be ignored in the short-term and improved over time in the long-term.

The prediction circuit 240 may assess the capabilities of one or more devices to generate an operational forecast. As a non-limiting example, the prediction circuit 240 alone, or in combination with the switching module, can poll a connected device for power usage, data generation, and data transfer capabilities to increase the accuracy of predicted activity. Such device polling may involve prediction circuit 240 initiated activity, such as test pattern writing, data readback, software execution, or screen brightness adjustment. As a result, the prediction circuit 240 can more accurately correlate logged activity to actual device results that indicate what connection alterations are necessary to establish, and/or maintain optimal computing device performance.

Figure 9:
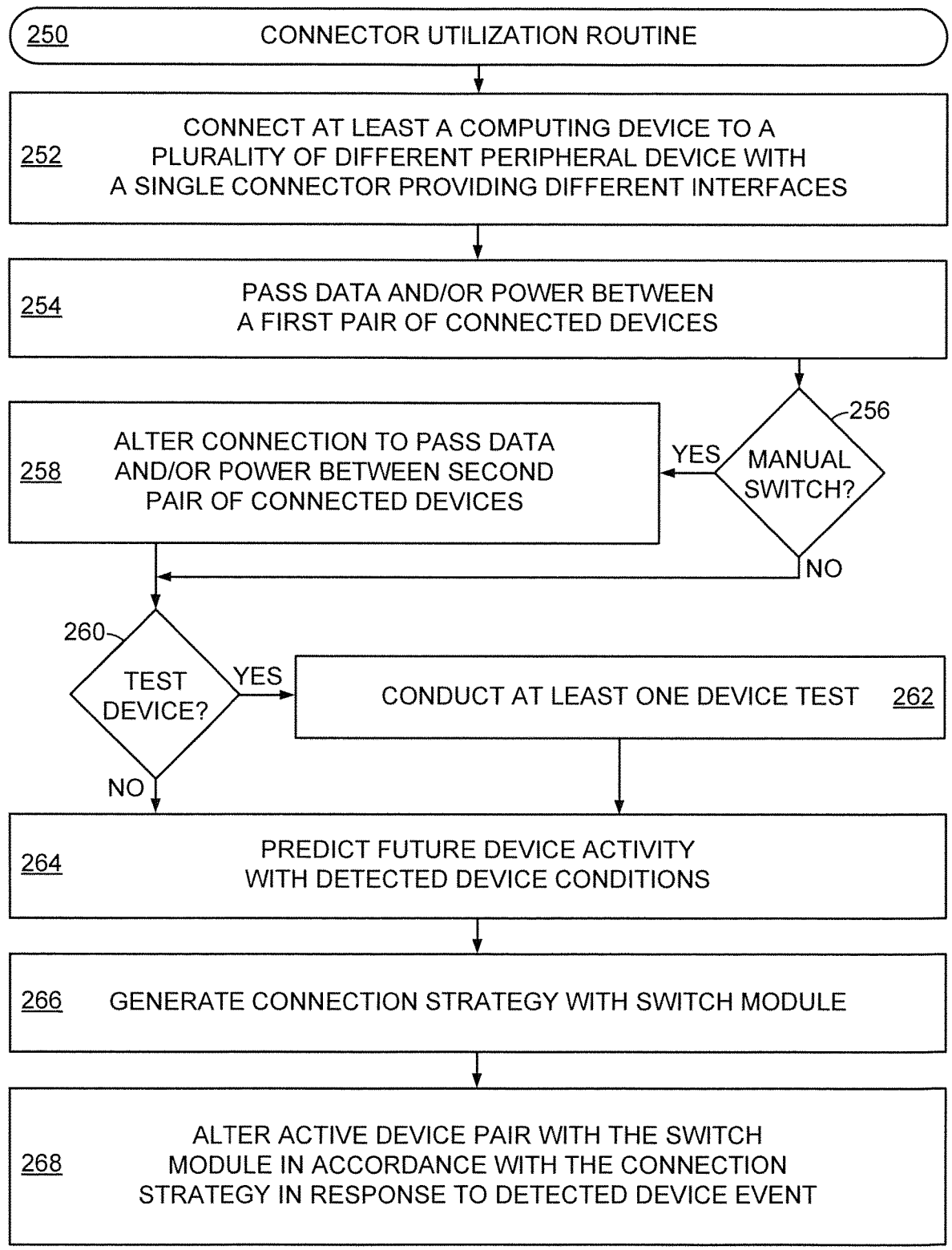
FIG. 9 is an example connector utilization routine that can be executed by the respective embodiments of FIGS. 1-8.

The example connector utilization routine 250 of FIG. 9 illustrates how the various embodiments of FIGS. 1-8 can be employed to provide optimal device performance. Initially, step 252 connects a plurality of different devices to a common connector having a switching module. It is noted that the connection of devices in step 252 can involve physically and electrically coupling at least one computing device and at least two peripheral devices to separate interfaces provided by the single connector.

The concurrent connection of multiple devices allows step 254 to pass data, power, or both between a first device and a second device. Such flow of data and/or power can be through the switching module of the connector or directly between devices in a configuration that bypasses the switching module. The passage of data and/or power between a pair of connected devices in step 254 can be continuously, or sporadically, active for any amount of time. Meanwhile, decision 256 determines if a user has manually selected a particular device pair connection. If so, and if the selected device pair is different than the active pair of step 254, then step 258 alters at least the electrical pathways through the switching module to provide a different power and/or data to flow between a different pair of connected devices. The alteration of step 258 may also coincide with the switching module altering the mode of at least one connected device (host to device or vice-versa).

The establishment of a new active pair in step 258, or if the original active pair remains from step 254, triggers decision 260 to evaluate if device testing is to be undertaken by the switching module. Step 262 proceeds to conduct at least one device test, such as with data writing, data transfer, device polling, test pattern execution, software execution, or device condition alteration. The testing results can be utilized in step 264 by a prediction circuit of the switching module to forecast one or more device activities. Alternatively, a denial of device testing in decision 260 advances routine 250 to step where activities are predicted based on polled and/or model information.

With the prediction of one or more device activities, step 266 generates a connection strategy that establishes at least one alteration to the switching module and/or active device pair in response to a yet-to-occur event, such as a power reserve level, average power usage, pending data command queue volume, average data transfer rate, instant data generation rate, or age of data. It is contemplated that the predicted activities are evaluated in step 264 for accuracy and only the predictions having an accuracy above a predetermined threshold, such as 90%, are utilized in step 266.

The connection strategy from step 266 is subsequently carried out by the switching module that alters the electrical pathway, data pathway, device mode, or any combination thereof in step 268. The altered active device pair can be utilized in consistent, or varying, manners for any amount of time to transfer any amount of data and/or power while routine 250 returns to decision 256 to ensure the devices of the connected system enjoy optimal performance despite changing system/device/user conditions.

Through the various embodiments of a peripheral connector conveyed in relation to FIGS. 1-9, a single connector can establish and maintain optimal data and power performance in at least one connected device. The ability to intelligently evaluate connected devices allows a switching module of the connector to generate a connection strategy that accurately prescribes connection alterations for predicted device activities. The connection strategy further allows for reactive adaptations to an active device pair that increase the likelihood of prolonged optimal device performance.

What is claimed is:
1. An apparatus comprising:
a switch module connected to a first interface, a second interface, and a third interface;
a computing device connected to the first interface;

a first peripheral device connected to the second interface, the first peripheral device communicating with the computing device via a first conduit extending through the switch module; and a second peripheral device connected to the third interface, the switch module configured to activate a second conduit extending through the switch module in response to a detected operational condition of the computing device as directed by a connection strategy generated by the switch module, the connection strategy consisting of a plurality of different proactive conduit activations to prevent at least one future computing device condition predicted by the switch module.

2. The apparatus of claim 1, wherein the computing device comprises a local controller and local memory.

3. The apparatus of claim 1, wherein the first peripheral device is a portable external battery.

4. The apparatus of claim 1, wherein the second peripheral device is a portable external data storage device.

5. The apparatus of claim 1, wherein the switch module comprises a local controller.

6. The apparatus of claim 1, wherein the switch module comprises a local memory.

7. The apparatus of claim 1, wherein the switch module comprises a prediction circuit.

8. The apparatus of claim 1, wherein the switch module comprises a plurality of electrical switches concurrently connected to multiple different interfaces of the first, second, and third interfaces.

9. The apparatus of claim 1, wherein the second interface is concurrently connected to the switch module via the first conduit and to the first interface via a third conduit.

10. A method comprising:
providing a switch module connected to a first interface, a second interface, and a third interface;
connecting a computing device to the first interface;
connecting a first peripheral device to the second interface;
connecting a second peripheral device to the third interface;
passing electrical signals between the first peripheral device and the computing device via a first conduit extending through the switch module;
predicting at least one future computing device condition with the switch module;
generating a connection strategy, with the switch module, comprising a plurality of different proactive conduit device pair activations to prevent the at least one future computing device condition; and
activating a second conduit extending through the switch module in response to the switch module detecting an operational condition of the computing device.

11. The method of claim 10, wherein the second conduit is activated in response to user engagement of a mechanical switch on the switch module.

12. The method of claim 10, wherein the detected operational condition is a power level.

13. The method of claim 10, wherein the detected operational condition is a data capacity.

14. The method of claim 10, wherein the detected operational condition is a data generation rate.

15. The method of claim 10, wherein the detected operational condition occurred at least once in the computing device.

16. The method of claim 10, further comprising altering a mode of the computing device in response to the detected operational condition.

17. The method of claim 10, wherein the detected operational condition is utilized by the switch module to generate a predicted operational condition, the second conduit being activated in response to the predicted operational condition.

18. The method of claim 10, wherein the connection strategy prescribes a conduit activation change triggered by a future computing device event.

19. The method of claim 18, wherein the connection strategy activates a third conduit between the first peripheral device and the second peripheral device.

20. The method of claim 18, wherein the connection strategy automatically triggers the switch module to execute the conduit activation action upon detection of the computing device event.

* * * * *